United States Patent
Zupan

(10) Patent No.: US 12,346,342 B2
(45) Date of Patent: Jul. 1, 2025

(54) EXCHANGING DATA WITH A DECENTRALIZED DISTRIBUTED DATABASE

(71) Applicant: Siemens Aktiengesellschaft, Munich (DE)

(72) Inventor: Nejc Zupan, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 7 days.

(21) Appl. No.: 18/279,096

(22) PCT Filed: Jan. 11, 2022

(86) PCT No.: PCT/EP2022/050387
§ 371 (c)(1),
(2) Date: Aug. 28, 2023

(87) PCT Pub. No.: WO2022/189044
PCT Pub. Date: Sep. 15, 2022

(65) Prior Publication Data
US 2024/0143619 A1    May 2, 2024

(30) Foreign Application Priority Data
Mar. 9, 2021    (EP) ...................................... 21161538

(51) Int. Cl.
*G06F 16/25*    (2019.01)
(52) U.S. Cl.
CPC .................. *G06F 16/258* (2019.01)

(58) Field of Classification Search
CPC .. G06F 16/258; G06Q 20/065; G06Q 20/389; G06Q 20/308; G06Q 20/405
See application file for complete search history.

(56) References Cited

U.S. PATENT DOCUMENTS

| | | | |
|---|---|---|---|
| 8,086,618 B2 * | 12/2011 | Lim | G06F 16/258 |
| | | | 707/756 |
| 2019/0347341 A1 * | 11/2019 | Carr | G06F 16/23 |

(Continued)

FOREIGN PATENT DOCUMENTS

| | | | | |
|---|---|---|---|---|
| CN | 110 609 679 A | 12/2019 | | |
| CN | 110609679 | * 12/2019 | | G06F 8/30 |

OTHER PUBLICATIONS

International Search Report & Written Opinion for PCT/EP2022/050387 mailed on May 2, 2022.

(Continued)

*Primary Examiner* — Huawen A Peng
(74) *Attorney, Agent, or Firm* — Schmeiser, Olsen & Watts LLP

(57) ABSTRACT

A method and a system for sending data to and/or retrieving data from a decentralized distributed database is provided. The method involves retrieving a transformation rule from a data library by the sending/retrieving system, wherein the transformation rule defines a transformation of data in a system-specific data structure into a database-specific data structure or vice versa. Sending and retrieving data involves a transformation of the data structure according to the transformation rule. The method ensures for example correctness, reusability, and/or forward and backward compatibility of data tracked in the decentralized distributed database.

17 Claims, 3 Drawing Sheets

(56) References Cited

U.S. PATENT DOCUMENTS

| | | |
|---|---|---|
| 2020/0167237 A1 | 5/2020 | Knuhtsen et al. |
| 2020/0220770 A1 | 7/2020 | Kawahara |
| 2020/0272608 A1* | 8/2020 | Dilts .................. G06F 16/26 |
| 2021/0152529 A1* | 5/2021 | Ruppin .................. H04L 63/20 |

OTHER PUBLICATIONS

Jurgelaitis Mantas et al: "Modelling principles for blockchain-based implementation of business or scientific processes" Apr. 25, 2019 (Apr. 25, 2019), pp. 1-5, XP055816849, Retrieved from the Internet: URL:http://ceur-ws.org/Vol-2470/p13.pdf [retrieved on Jun. 22, 2021] the whole document.

* cited by examiner

EXCHANGING DATA WITH A DECENTRALIZED DISTRIBUTED DATABASE

CROSS-REFERENCE TO RELATED APPLICATIONS

This application claims priority to PCT Application No. PCT/EP2022/050387, having a filing date of Jan. 11, 2022, which claims priority to European Application No. 21161538.0, having a filing date of Mar. 9, 2021, the entire contents both of which are hereby incorporated by reference.

FIELD OF TECHNOLOGY

The following relates to a computer-implemented method for storing data in and for retrieving data from a decentralized distributed database, and a computer program product for performing the methods steps. Furthermore, the following relates to a sending system and a receiving system, as well as a decentralized distributed database comprising such a sending system and/or receiving system.

BACKGROUND

Exchanging data with a decentralized distributed database usually requires both a definition of a specific data structure used for data processing in the decentralized distributed database and a corresponding implementation of the data structure on the client side, which is sending or retrieving the data. Hence, often a transformation of data from the client-defined data structure/data format into the data structure of the database is required. The process of integrating clients such as hardware devices and/or software applications to support a communication with a decentralized distributed database, as e.g., blockchain technologies, requires upgrading and configurating of the software that runs on the client side, which can be particularly challenging in the IoT-domain ("Internet of Things", IoT).

Data which are stored on the blockchain can be referred to as "assets". Assets represent for example a physical object, an IoT device measurement, an event, an alert, a notification, etc. Typically, whenever a new asset type is tracked on the blockchain, a client software and potentially also smart contracts executed on the database, need to be updated. Forward and backward compatibility and validity of assets is hence managed on the client side. However, especially for large and dynamic IoT-systems, such updates and their implementation can be costly, time consuming and error prone.

SUMMARY

An aspect relates to simplifying a data exchange with a decentralized distributed database.

Embodiments of the invention provide according to a first aspect a computer-implemented method for storing data in a decentralized distributed database, comprising the steps:

provide system data, wherein the system data are stored in a system-specific data structure of a system, and a system information of the system, which is connected to the decentralized distributed database, wherein the system is a device or an application and wherein the system information comprises information about a system type and/or a system version, receiving information about a database-specific data structure, which is defined for processing data in the decentralized distributed database, receiving a first transformation rule depending on the system information, wherein the first transformation rule is assigned to the database-specific data structure and defines a transformation of data with a system-specific data structure to the database-specific data structure, transforming the system data by applying the first transformation rule, thus generating transformed system data, wherein the transformed system data are stored in the database-specific data structure, and sending the transformed system data to the decentralized distributed database.

Embodiments of the invention further provide according to a second aspect a computer-implemented method for retrieving data from a decentralized distributed database by a system, wherein the system is a device or an application, comprising the steps:

providing information about a system-specific data structure and a system information of the system, which is connected to the decentralized distributed database, wherein the system information comprises information about a system type and/or a system version, retrieving data from the decentralized distributed database, wherein the data are stored in database-specific data structure, receiving a second transformation rule depending on the system information, wherein the second transformation rule is assigned to the database-specific data structure and defines a transformation of data with the database-specific data structure to the system-specific data structure, transforming the data by applying the second transformation rule, thus generating transformed data, wherein the transformed data are stored in the system-specific data structure, and outputting the transformed data.

Embodiments of the invention further provide according to another aspect a sending system, wherein the sending system is a device or an application, comprising:

a storage module which is configured to provide system data, wherein the system data are stored in a system-specific data structure of the sending system, and a system information of the sending system connected to the decentralized distributed database, wherein the system information comprises information about a system type and/or a system version, a first interface which is configured to receive information about a database-specific data structure, which is defined for processing data in the decentralized distributed database and a first transformation rule depending on the system information, wherein the first transformation rule is assigned to the database-specific data structure and defines a transformation of data with a system-specific data structure into the database-specific data structure, a transformation module which is configured to apply the first transformation rule to the system data generating transformed system data, wherein the transformed system data are stored in the database-specific data structure, and
a second interface which is configured to send the transformed system data to the decentralized distributed database.

Embodiments of the invention further provide according to another aspect a receiving system, wherein the receiving system is a device or an application, comprising:
a storage module which is configured to provide information about a system-specific data structure and a system information of the receiving system, which is connected to the decentralized distributed database, wherein the system information comprises information about a system type and/or a system version,
a first interface which is configured
to retrieve data from the decentralized distributed database, wherein the data are stored in database-specific data structure, and
to receive a second transformation rule depending on the system information and/or the system-specific data structure, wherein the second transformation rule is assigned to the database-specific data structure and defines a transformation of data with the database-specific data structure into the system-specific data structure,
a transformation module which is configured to apply the second transformation rule to the data generating transformed data, wherein the transformed data are stored in the system-specific data structure,
and
a second interface which is configured to output the transformed data.

Embodiments of the invention further provide according to another aspect a decentralized distributed database, which is connected to an aforementioned sending system and/or to an aforementioned receiving system, the database comprising:
a data library which is configured to store a variety of database-specific data structures and assigned transformation rules, wherein a transformation rule defines a transformation of data with a system-specific data structure into a database-specific data structure and/or a transformation of data with a database-specific data structure into a system-specific data structure,
and
a data management module which is configured to retrieve information about a database-specific data structure and/or an assigned transformation rule from the data library and to provide the information to the sending system and/or the receiving system.

The components of the decentralized distributed database and/or the sending/receiving system itself can be hardware and/or software components.

Unless indicated otherwise in the description below, the terms "perform", "calculate", "computer-aided", "compute", "discover", "generate", "configure", "reconstruct" and the like relate to actions and/or processes and/or processing steps that alter and/or produce data and/or that convert data into other data, the data being able to be presented or available as physical variables, in particular, for example as electrical impulses. In particular, the expression "computer" should be interpreted as broadly as possible in order to cover in particular all electronic devices having data processing properties.

Computers can therefore be for example personal computers, servers, programmable logic controllers (PLCs), handheld computer systems, Pocket PC devices, mobile radios and other communication devices that can process data in computer-aided fashion, processors and other electronic devices for data processing.

Within the context of embodiments of the invention, "computer-implemented" can be understood to mean for example an implementation of the method in which in particular a processor carries out at least one method step of the method. Within the context of embodiments of the invention, a processor can be understood to mean for example, a machine or an electronic circuit. A processor can be in particular a central processing unit (CPU), a microprocessor or a microcontroller, for example an application-specific integrated circuit or a digital signal processor, possibly in combination with a memory unit for storing program instructions, etc. A processor can, by way of example, also be an IC (integrated circuit), in particular an FPGA (field programmable gate array) or an ASIC (application-specific integrated circuit), or a DSP (digital signal processor) or a graphics processor GPU (graphics processing unit). A processor can also be understood to mean a virtualized processor, a virtual machine or a soft CPU.

The processor can, by way of example, also be a programmable processor that is equipped with configuration steps for carrying out the method according to embodiments of the invention or that is configured by configuration steps such that the programmable processor realizes the features according to embodiments of the invention for the method, the component, the modules or other aspects and/or sub-aspects of embodiments of the invention.

Within the context of embodiments of the invention, a "system" can be understood to mean a technical system, a client, a device, a machine, a software system, an (software) application etc. Such system can be connected to and can exchange data with the decentralized distributed database data. A system can be a sending system and/or receiving system. A system can for example be also part of a device, e.g., an IoT device. In embodiments, a system is part of a node of the decentralized distributed database.

Within the context of embodiments of the invention, "system-specific" can be understood to mean specific for the particular system, system type, system version and/or related to the system. For example, a system-specific data structure is defined specifically for a system depending on a system type and/or system version. A data structure can also be understood as a data format. System data/System-specific data are therefore in particular stored in such a system-specific data structure/format.

Within the context of embodiments of the invention, "system information" relates to a system type and/or a system version and/or information about a system-specific data structure. A system information can be linked to a system-specific data structure, as a data structure can depend on the system type and/or version. The system information, hence, can further define requirements relative to a data structure.

Within the context of embodiments of the invention, "database-specific" can be understood to mean specific for the decentralized distributed database. Hence, a "database-specific data structure" can be understood to mean a specific data structure defined or used for processing data in the decentralized distributed database.

Within the context of embodiments of the invention, a "transformation rule", or translation rule, can be understood to mean an instruction for conversion data which is stored in a first data structure/format into a second data structure/format, e.g., a transformation from a system-specific to database-specific data structure. A transformation rule can therefore comprise mapping steps or requirements, how a data representation is mapped to another representation. A transformation rule can describe the process of converting the selected data source (for example a file in the data structure) in the format expected by the target system. Transformation rule can contain one or more instructions that define the mapping between the data structure formats. A data structure consists of many different objects and data filed. Objects can also be nested. The following types of mapping/transforming can be available:

Renaming the data field from source field name to the target field name. A transformation rule then can contain type of mapping, source filed identifier, target field name.

Changing data field data type (example: converting field with "string" type containing time a date information into a "date/time" specific data filed format). A transformation rule can then contain a type of mapping, source field data type, target field data type, function to transform between data types.

Transforming the data field value (example: multiplying the field value by 100 to convert the percentage represented on a scale from 0 to 1 as a percentage represented on a scale from 0 to 100). A transformation rule then can contain type of mapping, field identifier, function that contains logic for transforming field value.

Removing a specific field present in the source data structure from the target data structure. A transformation rule can then contain a type of mapping and the filed identifier that should be removed.

Adding a new data field in the target data structure which is not present in the source data structure. A transformation rule can then contain a type of mapping and the parent object field identifier to which a new field should be added and/or a function that can be applied to the added field.

Applying a custom function on a source data field. Such a custom function can contain combination of different mapping types specified above.

The ability to apply custom function to transform data from the source to target format allows for example to define a plurality of different mappings, wherein the above listed mappings can be understood as examples. On a single data field of the data structure, multiple mapping types listed above can be applied. A transformation rule can contain many different mappings for many different data fields that are part of the data structure.

Within the context of embodiments of the invention, a "module" can be understood to mean for example a processor and/or a memory unit for storing program instructions. By way of example, the processor is configured specifically to execute the program instructions such that the processor performs functions to implement or perform the method according to embodiments of the invention or a step of the method according to embodiments of the invention. A module can, by way of example, also be a node of the distributed database system that for example performs/realizes the specific functions/features of an applicable module. The respective modules can, by way of example, also be in the form of separate or standalone modules. To this end, the applicable modules can comprise further elements, for example. These elements are for example one or more interfaces (e.g., database interfaces, communication interfaces—e.g., network interface, WLAN interface) and/or an evaluation unit (e.g., a processor) and/or a memory unit. The interfaces can be used for example to interchange (e.g., receive, convey, send or provide) data. The evaluation unit can be used for example to compare, check, process, assign or calculate data in computer-aided and/or automated fashion. The memory unit can be used for example to store, retrieve or provide data in computer-aided and/or automated fashion. A module can, by way of example, also be a software portion or an application executed by a computer.

Within the context of embodiments of the invention, "comprise", in particular in regard to data and/or information, can be understood to mean for example (computer-aided) storage of applicable information or of an applicable datum in a data structure/data record (which e.g., is in turn stored in a memory unit).

Within the context of embodiments of the invention, "assign", in particular in regard to data and/or information, can be understood to mean for example computer-aided assignment of data and/or information. Hence, for example a transformation rule can be assigned to a specific data structure, which can be understood to mean that they are linked to each other.

Within the context of embodiments of the invention, "provide", in particular in regard to data and/or information, can be understood to mean for example computer-aided provision. Provision is effected for example via an interface (e.g., a database interface, a network interface, an interface to a memory unit). This interface can be used for example to convey and/or send and/or retrieve and/or receive applicable data and/or information during the provision. Within the context of embodiments of the invention, "provision" can also be understood to mean for example loading or storing, for example of a transaction containing applicable data. "Provision" can also be understood to mean for example transmitting (or sending or conveying) of applicable data from one node to another node of the blockchain or of the distributed database system (or the infrastructure thereof).

Within the context of embodiments of the invention, "smart contract process" can be understood to mean in particular an execution of a program code (e.g., of the control instructions) in a process by the distributed database system or the infrastructure thereof.

Within the context of embodiments of the invention, a "program code" (e.g., a smart contract) can be understood to mean for example a program instruction or multiple program instructions, in particular stored in one or more transactions. The program code is in particular executable and can be executed by the distributed database system. The program code is executed by the infrastructure of the distributed database system. This involves for example a virtual machine being realized by the infrastructure of the distributed database system. Within the context of embodiments of the invention, a "smart contract" can be understood to mean for example an executable program code.

Within the context of embodiments of the invention, a "decentralized distributed database", which, by way of example, can also be referred to as a distributed database, can be understood to mean for example a locally distributed database, a blockchain, a distributed ledger, a distributed memory system, a distributed ledger technology (DLT) based system (DLTS), a revision-proof database system, a cloud, a cloud service, a blockchain in a cloud, a network application, a distributed communication system or a peer-to-peer database. A "distributed database system" can also be understood to mean for example a distributed database system that has at least some of its nodes and/or devices and/or infrastructure implemented by a cloud. By way of example, the applicable components are implemented as nodes/devices in the cloud (e.g., as virtual nodes in a virtual machine). A distributed database system can also be a distributed communication system for data interchange or a peer-2-peer communication system or a peer-2-peer application, for example. This can be a network or a peer-2-peer network, for example.

Within the context of embodiments of the invention, a "blockchain node", "node", "node of a distributed database system" and the like can be understood to mean for example devices (e.g., field devices), computers, smartphones, clients or subscribers that perform operations for (with) the distributed database system (e.g., a blockchain). Such nodes can, by way of example, execute transactions of a distributed database system or the data blocks thereof or insert or concatenate new data blocks with new transactions into the distributed database system by new data blocks.

It is one advantage of embodiments of the present invention that the update and implementation of data structures is moved from the client side to a database-based management of the data structures. In embodiments, the information about database-specific data structures and corresponding transformation rules are stored in a data library, which can be connected to the database or is managed by the database/the management module of the database in a decentralized manner. A sending or retrieving system therefore retrieves at least a transformation rule depending on system information for transforming system data to be stored in the database or retrieved data from the database. Therefore, relevant data structures and assigned transformation rules are defined and stored in the data library when setting up the database.

Hence, the management of the required data structures and corresponding transformation rules for exchanging data with the database can be system-agnostic. In embodiments, all information required for exchanging data with the database can be retrieved from the database. Embodiments of the invention further decrease the coupling of the system and the logic running in smart contracts in the database. It allows updating asset data structures while maintaining forward and backward compatibility of assets that are tracked on the database as well as ensures correctness of the data structures.

Therefore, any potential translation error can already be identified on the client side and can be solved locally instead of propagating through the database and compromising correctness of data stored on the database.

According to a preferred embodiment, the first and/or second transformation rule can define a transformation of data with a system-specific data structure to the database-specific data structure and/or a transformation of data with the database-specific data structure to the system-specific data structure.

This ensures forward and backward compatibility.

According to a preferred embodiment, the database-specific data structure can comprise code-specific data structure and wherein processing of data in the decentralized distributed database by a program code is based on a transformation rule which is configured to transform data with database-specific data structure to the code-specific data structure.

An executable program code, e.g., a smart contract, can require a code-specific data structure for processing the data in the database. The code-specific data structure can be identical or different from the database-specific data structure. If it is different, a transformation rule is defined for the data structure transformation from a database-specific to a code-specific data structure.

According to a preferred embodiment, the information about the database-specific data structure, the first transformation rule and/or the second transformation rule can be stored in a data library which is configured to store a variety of database-specific data structures and/or assigned transformation rules.

Hence, a variety of database-specific data structures and/or assigned transformation rules can be retrieved by a system. The data library can be a central system connected to the decentralized distributed database. Alternatively, the data library can be implemented across the nodes of the database, such that nodes of the decentralized distributed database can run a local instance of the data library.

According to a preferred embodiment, the first and/or second transformation rule can be received from the data library.

In embodiments, before exchanging data with the decentralized distributed database, a system queries a transformation rule for transforming data in the respectively required data structure.

According to another embodiment, depending on the system information, the information about the database-specific data structure, the first transformation rule and/or the second transformation rule can be selected from the variety of stored of database-specific data structures and assigned transformation rules.

A system can query a transformation rule and/or an information about the database-specific data structure depending on its system information. Alternatively, a system can query and retrieve all available transformation rules and information about database-specific data structures stored in the data library and a selection of a relevant transformation rule can be performed locally on the system. This ensures for example that relevant transformation rules are available for data structure transformation on the system such that no custom logic for implementing data structure transformation is required.

According to a preferred embodiment, a new database-specific data structure and/or a new transformation rule can be added to the data library or the database-specific data structure and/or the transformation rules can be updated while keeping originally stored database-specific data structures and/or transformation rules.

Therefore, a change in a transformation rule and/or a data structure can be transmitted to the data library, while the original transformation rules and data structures are maintained. This ensures for example compatibility with older system versions.

According to another embodiment, the new database-specific data structure and/or the new transformation rule can be added to the data library or the database-specific data structure and/or the transformation rule can be updated based on a consensus method performed by nodes of the decentralized distributed database.

Updates can therefore only be implemented based on the consensus result, i.e., when agreement is reached.

According to another embodiment, a transformation rule can be generated by the system depending on the system-specific data structure and the retrieved information about the database-specific data structure.

A transformation rule can in particular be defined at setup of the database or later when a functionality extension, i.e., an update, is required. Based on the information about the database-specific structure, a system can furthermore generate a transformation rule itself. Such generated transformation rule can further be stored in the data library.

According to another embodiment, a system-specific data structure is assigned to the system and/or a system is assigned to a system-specific data structure.

A system-specific structure can hence be also linked to more than one system, wherein these systems are for example of the same type and/or version.

In addition, a computer program product (non-transitory computer readable storage medium having instructions, which when executed by a processor, perform actions) comprising program instructions for performing the aforementioned methods according to embodiments of the invention is claimed, wherein one of the methods according to embodiments of the invention, all of the methods according to embodiments of the invention or a combination of the methods according to embodiments of the invention is performable by the computer program product each time.

BRIEF DESCRIPTION

Some of the embodiments will be described in detail, with reference to the following figures, wherein like designations denote like members, wherein.

DETAILED DESCRIPTION

Moreover, in particular a (relevant) person skilled in the conventional art, with knowledge of the method claim/method claims, is of course aware of all routine options for realizing products or options for implementation in the conventional art, and so there is no need in particular for independent disclosure in the description. In particular, these customary realization variants known to a person skilled in the conventional art can be realized exclusively by hardware (components) or exclusively by software (components). Alternatively and/or additionally, a person skilled in the conventional art, within the scope of his/her expert ability, can choose to the greatest possible extent arbitrary combinations according to embodiments of the invention of hardware (components) and software (components) in order to implement realization variants according to embodiments of the invention.

In particular, in view of the high number of different realization options, it is impossible and also not helpful or necessary for the understanding of embodiments of the invention to name all these realization options. In this respect, in particular all the exemplary embodiments below are intended to demonstrate merely by way of example a few ways in which in particular such realizations of the teaching according to embodiments of the invention could be manifested.

Consequently, in particular the features of the individual exemplary embodiments are not restricted to the respective exemplary embodiment, but rather relate in particular to embodiments of the invention in general. Accordingly, features of one exemplary embodiment can also serve as features for another exemplary embodiment, in particular without this having to be explicitly stated in the respective exemplary embodiment.

Figure 1:
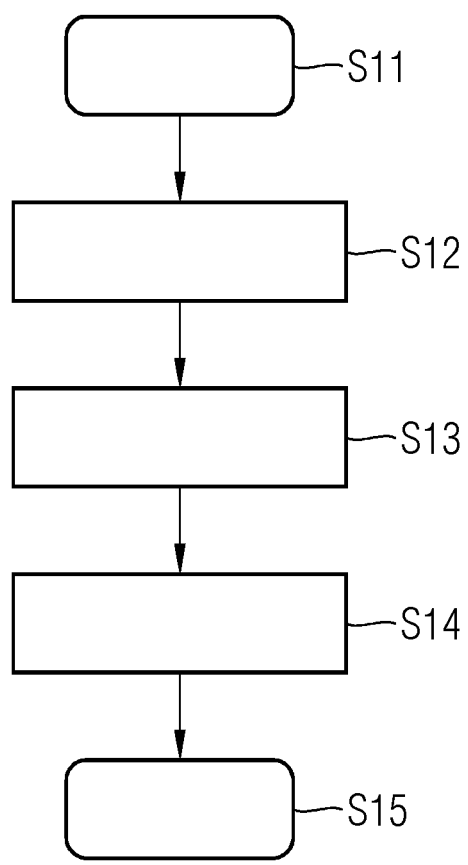
FIG. 1 shows a flow chart illustrating the method steps of an embodiment of the computer-implemented method for storing data in a decentralized distributed database.

FIG. 1 shows an exemplary embodiment of the invention. It shows a flow chart illustrating the method steps involved in the computer-implemented method for storing data in a decentralized distributed database. Such method can for example be performed by a sending system as exemplary shown in FIG. 3, which is connected to the decentralized distributed database. The system can for example be understood to mean a client (device), a device, a software system, or an application. The sending system is configured to send to, insert into and/or store data in the decentralized distributed database.

In embodiments, the method comprises the following steps:

In the first step S11 the (sending) system provides system data, which shall be stored/inserted in(to) the decentralized distributed database. The system data can for example be application data, measurement data, sensor data, transaction data, etc. The system data can be stored in a system-specific data structure of the system. The system-specific data structure is defined for the system or at least for the system type and/or system version and/or the type of data/data type provided by the system. Furthermore, in the first step S11 a system information of the system, e.g., system version or type is provided.

In the next step S12, information about a database-specific data structure, which is defined for processing data in the decentralized distributed database, can be queried by the system, if not already queried and/or stored previously. Hence, this step can be optional in case the system has already queried information about the database-specific data structure. The information about the database-specific data structure for example comprises information about the data structure/format in which data are processed/stored in the database. Such information can be obtained from a data library linked to the decentralized distributed database.

In the next step S13 a transformation rule can be received depending on the system information if the system has not received at least one transformation rule yet. Hence, this step can be optional, in case the system has already received at least one transformation rule. The system information comprises information about a system type, a system version and/or information about a system-specific data structure. The transformation rule is assigned to the database-specific data structure and defines a transformation of data with a system-specific data structure to the database-specific data structure. For example, a transformation rule is received which matches the system requirements given by the system information for the data structure transformation. In embodiments, the transformation rule is queried and received from the data library of the decentralized distributed database. The transformation rule can for example be selected from a variety of stored transformation rules depending on the system information. In other words, the first transformation rule is queried depending on the system information.

In embodiments, at least the database-specific structure and/or the corresponding transformation rule is defined when setting up the database system. Hence, a variety of database-specific data structures and/or assigned transformation rules can be stored in the data library and retrieved from there.

In the next step S14, the system data is transformed by applying the retrieved/selected transformation rule, thus generating transformed system data, wherein the transformed system data are stored in the database-specific data structure. The transformation can be performed by a transformation module of the system.

In the next step S15, the transformed system data are sent to the decentralized distributed database. The transformed system data are therefore sent to the decentralized distributed database in the correct database-specific data structure. The transformed system data can for example be stored in and/or further processed by the decentralized distributed database.

Figure 2:
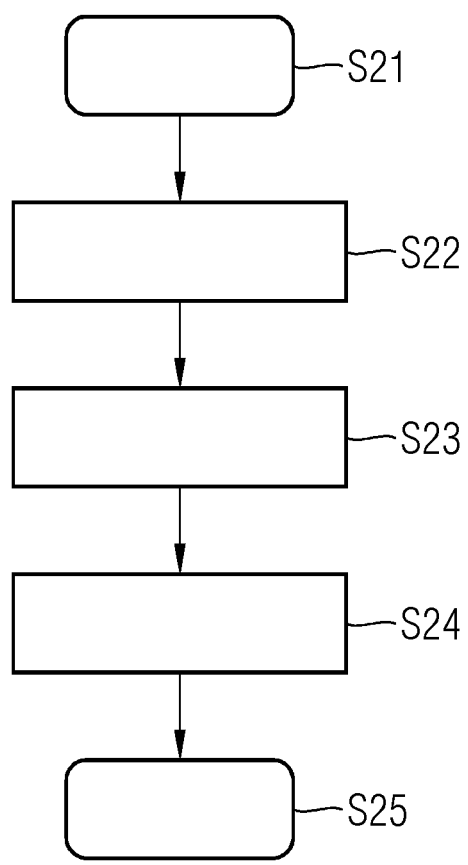
FIG. 2 shows a flow chart illustrating the method steps of an embodiment of the computer-implemented method for retrieving data from a decentralized distributed database.

FIG. 2 shows another exemplary embodiment of the invention. It shows a flow chart illustrating the method steps involved in the computer-implemented method retrieving data from a decentralized distributed database by a system. Such method can for example be performed by a retrieving system as exemplary shown in FIG. 3, which is connected to the decentralized distributed database. The system can for example be understood to mean a client (device), a device, a software system, or an application.

In embodiments, the method comprises the following steps.

In the first step S21 information about a system-specific data structure and a system information of the (retrieving) system is provided. This information is for example stored in a memory module of the system.

In the next step S22, data from the decentralized distributed database is retrieved, wherein the data are stored in database-specific data structure.

To further process the data by the system, the data shall be transformed to the system-specific data structure.

Therefore, in the next step S23, a transformation rule depending on the system information and/or the system-specific data structure is retrieved from the decentralized distributed database, from a data library of the database, in particular if the system has not retrieved at least one transformation rule yet. Hence, this step can be optional in case the system has already retrieved at least one transformation rule. For example, when querying the database-specific data structures of the same type multiple times, the transformation rule can be temporarily stored locally on the system and applied on the data-structure of the same type.

The transformation rule can be selected from a variety of transformation rules depending on the system information and/or the system-specific data structure. The transformation rule is assigned to the database-specific data structure and defines a transformation of data with the database-specific data structure to the system-specific data structure.

In the next step S24, the data retrieved from the database are transformed into the system-specific data structure by applying the transformation rule. Hence, transformed data are generated, wherein the transformed data are stored/presented in the system-specific data structure.

In the next step S25 the transformed data are outputted. The transformed data are then presented in the system-specific data structure and can thus be easily further processed by the retrieving system and/or another system or device which is coupled/connected to the retrieving system.

Figure 3:
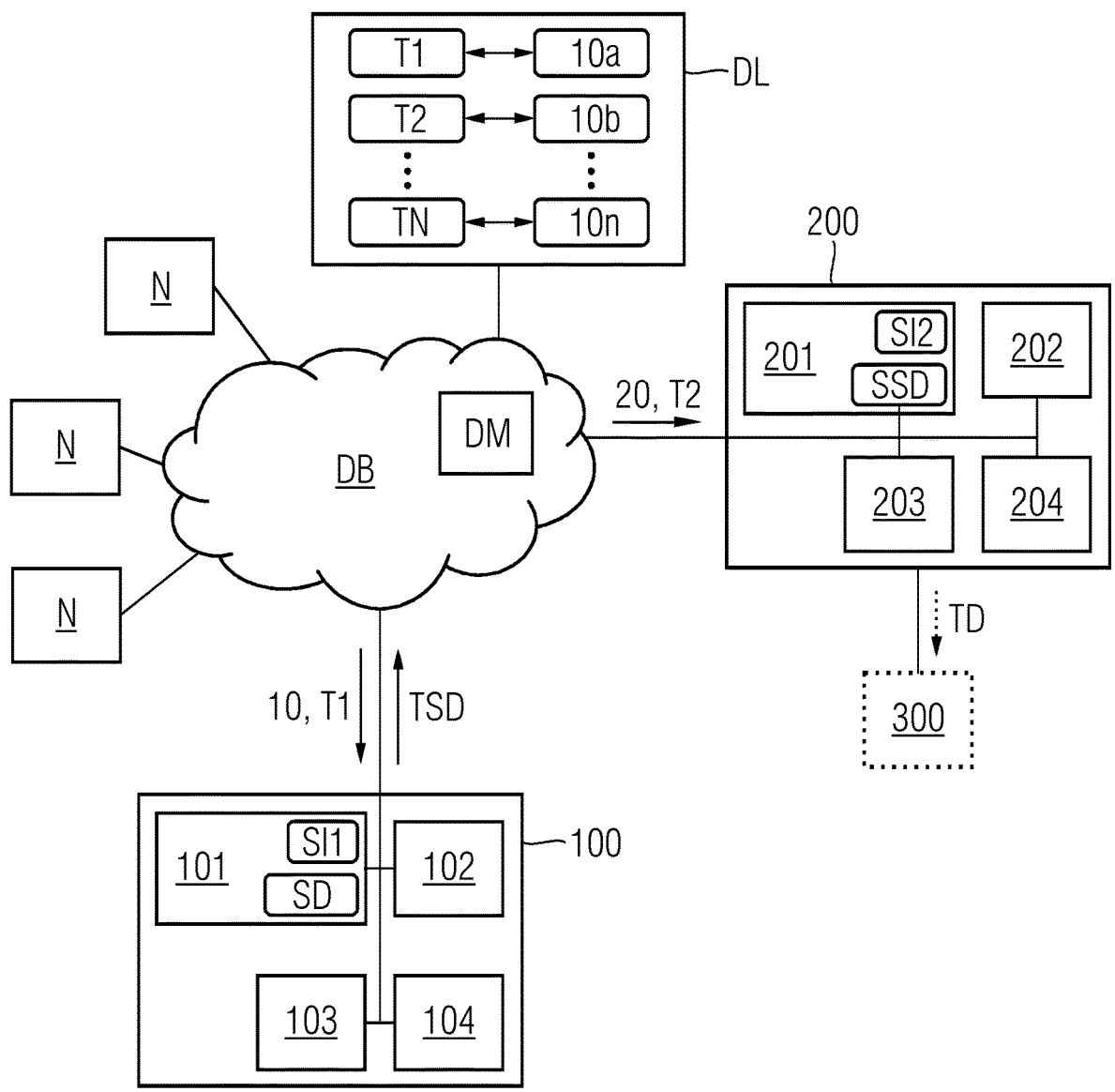
FIG. 3 shows a block diagram illustrating an embodiment of a decentralized distributed database, as well as an embodiment of a sending system and an embodiment of a receiving system.

FIG. 3 shows another exemplary embodiment of the invention. It shows a schematic block diagram of a decentralized distributed database DB configured to perform data exchange with connected systems, as e.g., devices or applications.

The decentralized distributed database DB comprises a plurality of nodes N, as well as at least a sending system 100 and a retrieving system 200.

The decentralized distributed database DB comprises a data library DL, which can be (decentrally) implemented on the database, e.g., using smart contracts. Alternatively, the data library can be external to and connected to the decentralized distributed database DB. The data library is configured to store a variety of database-specific data structures 10a, 10b, ..., 10n and assigned transformation rules T1, T2, ..., Tn, wherein multiple transformation rules can be assigned to a database-specific data structure. A transformation rule T1, T2, ..., Tn defines a transformation of data with a system-specific data structure into a database-specific data structure and/or a transformation of data with a database-specific data structure into a system-specific data structure.

Before exchanging data with the decentralized distributed database DB, a system 100, 200 queries at least one of the transformation rules T1, T2, ..., Tn for transforming data from a database-specific data structure into a system-specific data structure or vice versa, wherein the transformation rule is queried/selected depending on system information of the system and/or a system-specific data structure.

A system for sending/storing/inserting data into the database DB can for example be a sending system 100. The sending system 100 comprises a storage module 101 which is configured to provide system data SD, which are stored in a system-specific data structure of the sending system 100, and a system information SI1 of the sending system 100. The system information SI1 can for example comprise information about the system type and/or version. The sending system 100 further comprises a first interface 102 which is configured to receive information about a database-specific data structure 10, which is defined for processing data in the decentralized distributed database DB, and at least one first transformation rule T1 depending on the system information SI1. In embodiments, the information about the database-specific data structure 10 and/or the first transformation rule T1 is retrieved from the data library DL via the database DB. In particular, the information about the database-specific data structure 10 and the first transformation rule T1 are retrieved depending on the system information SI1.

The sending system 100 can also retrieve a plurality or all information about database-specific data structures 10a, 10b, ..., 10n and/or assigned transformation rules T1, T2, ..., Tn, and the sending system 100 can select an appropriate transformation rule T1 thereof depending on the system information SI1. The first transformation rule T1 is assigned to the database-specific data structure and defines a transformation of data with a system-specific data structure into the database-specific data structure.

The sending system 100 further comprises a transformation module 103 which is configured to apply the first transformation rule T1 to the system data SD generating transformed system data, wherein the transformed system data are stored in the database-specific data structure. The transformed system data TSD can then be sent to the decentralized distributed database DB via a second interface 104. The second interface 104 and the first interface 101 can for example be the same. The transformed system data TSD can then be stored in the distributed database DB.

A system for retrieving/receiving data from the decentralized distributed database DB can be for example a receiving system 200.

The receiving system 200 comprises a storage module 201 which is configured to provide information about a system-specific data structure SSD and a system information SI2 of the receiving system 200.

The receiving system 200 further comprises a first interface 202 which is configured to retrieve data 20 from the decentralized distributed database DB. The data 20 are stored in one database-specific data structure 10a, ..., 10n. For further processing by the receiving system 200 and/or by a coupled further device or application 300, the data 20 will be transformed into the system-specific data structure SDD.

The system-specific data structure SSD is assigned to the system 200 and/or a system is assigned to a system-specific data structure. The system-specific data structure SSD can for example be described in the system information of the system. This system-specific data structure SDD is suited for further data processing by the receiving system 200 and/or by the coupled device/application 300. For example, the data can be used to control such coupled device/application 300.

Therefore, the first interface 102 is further configured to receive a second transformation rule T2 depending on the system information and/or the system-specific data structure SSD, wherein the second transformation rule T2 is assigned to the database-specific data structure 10a, ..., 10n and defines a transformation of data with the database-specific data structure into the system-specific data structure. The receiving system 200 further comprises a transformation module 203 which is configured to apply the second transformation rule T2 to the data 20, thus generating transformed data TD, wherein the transformed data TD are then presented in the system-specific data structure SDD. The transformed data TD can then for example be transmitted to a coupled device or application 300 via a second interface 204 which is configured to output the transformed data TD. The device or application 300 or the receiving system 200 can for example be controlled by the transformed data TD.

The sending system 100 can for example also comprises the modules and interfaces of the receiving system 200 and vice versa. In other words, a system for exchanging data with the decentralized distributed database DB can comprises modules and interfaces according to the sending system 100 and/or the receiving system 200. In particular, a respective transformation module can then be configured to apply transformation rules for transforming data with system-specific data structures into database-specific data structures and vice versa. In embodiments, such a system can be a device or application connected to the decentralized distributed database DB for data communication.

Hence, the sending system 100 and the receiving system 200 can for example be of the same system type and can process data in the same system-specific data structure SDD. Therefore, for transforming data from a database-specific data structure to the system-specific data structure and vice versa transformation rules T1, T2 are needed, which can be for example linked to each other.

Information about database-specific data structures 10a, ..., 10n, as well as transformation rules T1, ..., Tn are stored in the data library DL. The management of this information is performed by a data management module DM which is configured to retrieve information about a database-specific data structure 10a, ..., 10n and/or an assigned transformation rule T1, ..., Tn from the data library and to provide the information (on request) to the sending system 100 and/or the receiving system 200. Hence, when querying the data library to retrieve the information, the request can be processed by the management module.

The information of database-specific data structure can further comprise information about code-specific data structure. A code-specific data structure is for example used by a program code, e.g., a smart contract, executed on the database. Hence, processing of data in the decentralized distributed database by the program code can require a transformation of data which are stored in a database-specific structure into the code-specific structure if these data structures are not matching or overlapping. Transformation rules for that kind of transformation can also be stored in the data library DL. Hence, when executing such a program code, the execution can comprise a query for a relevant transformation rule and applying this transformation rule.

The transformation rules T1, ..., Tn define at least one transformation of data with a system-specific data structure to the database-specific data structure or vice versa. A transformation rule for transforming system-specific data structure to the database-specific data structure can further be generated by a sending system 100 or receiving system 200 itself. The generation of the transformation rule depends on the system-specific data structure SSD and the retrieved information about the database-specific data structure 10.

The database-specific structures 10a, ..., 10n and/or the assigned transformation rules T1, ..., Tn can be updated and/or complemented, for example when a new database-specific data structure and/or a new transformation rule is generated or provided. The update of the database-specific structures 10a, ..., 10n and/or the assigned transformation rules T1, ..., Tn maintains the originally stored database-specific data structures and/or transformation rules.

Updating and complementing the data library can be performed by the data management module DM. Alternatively or in addition, updating and complementing can be based on a consensus method performed by nodes N of the decentralized distributed database.

Based on FIG. 3, a further embodiment of the invention can be described as follows:

The decentralized distributed system DB can for example be understood as a blockchain network, which is formed by the blockchain nodes N.

A system 100, 200 can be understood to mean of a client/device type, e.g., hardware device, software that runs on the hardware device, edge device, automation script, application, mobile/web application, etc., that integrates with the blockchain network DB. A system 100, 200 can also be a blockchain node.

A system 100, 200 can provide system data, also referred to as an asset, which is stored in system-specific data structure. The system-specific data structure is linked to the system 100, 200.

The data management component DM manages the assets, stored in the database-specific data structure 10a, ..., 10n, and the transformation rules T1, ..., Tn used in the blockchain network DB. The management component can be part of the blockchain nodes N and therefore distributed across the blockchain network DB.

The data library stores the database-specific structure information 10a, ..., 10n, and the linked transformation rules T1, ..., Tn and manages the versions of the database-specific structure and the transformation rules.

At setup of the blockchain network and/or at a later stage, when updating the database-specific structure and/or transformation rules, the assets are defined. In this asset definition phase, the nodes/stakeholders/organizations partaking in the blockchain network need to define all necessary database-specific data structures and transformation rules that are needed by the clients/devices that are/will be integrated with the blockchain network. The database-specific data structures and transformation rules are stored in the data library and accessible by the management module DM. In embodiments, each blockchain node/system N, 100, 200 runs an instance of the management module DM containing a local instance of the data library DL (not shown), which is synchronized between all nodes N, 100, 200 in the blockchain network. Synchronization is consensus-based which ensures the correctness of the data structures and transformation rules across the blockchain network while being byzantine fault tolerant.

The variety of existing DSLs (domain specific language) or IDLs (interface definition language) or MLs (markup language) can be used to define/enforce the asset representation, i.e., the database-specific data structures.

When a new data structure type/version and/or a new transformation rule is added or an existing one needs to be updated, the changes are confirmed by all stakeholders/organizations of the blockchain network. Changes are after confirmation synchronized and propagated across the complete network. Furthermore, changes and new additions are performed without modification of the existing clients/smart contracts that are already integrated and running on the blockchain network.

A system 100, 200 can generate data or it serves as a gateway for specific set of data that are tracked on the blockchain network. A system can query a complete set of database-specific data structures and/or transformation rules that correspond to its system type/version from the data library DL. Based on the relevant transformation rule, the system can transform raw data to the database-specific data structure without the implementation of a custom logic on the system.

Hence, the rules on how to interpret/represent/translate/exchange data are defined with the accompanied transformation rules. This way an automatic backward and forward compatibility of assets/data can be enforced.

This approach unifies data structures across the complete system. It decouples asset type definition between system/client and the database and enforces correctness of the data that are persisted on the blockchain.

A use case can be for example a (smart) sensor providing sensor data to the blockchain. Such data can hold many different states. When the structure/characteristics of the sensor data change, the asset representation, i.e., the system-specific and/or database-specific structure can change as well. Hence, the system-agnostic management of data structures and corresponding transformation rules helps to maintain a correct data representation and forward and backward compatibility.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-implemented method for storing data in a decentralized distributed database, comprising:
   providing, by a sending system, system data, wherein the system data are stored in a system-specific data structure of the sending system, and providing a system information of the sending system, the system being connected to the decentralized distributed database, wherein the sending system is a device or an application and wherein the system information comprises information about a system type and/or a system version;
   receiving by the sending system, information about a database-specific data structure, which is defined for processing data in the decentralized distributed database;
   receiving, by the sending system, a first transformation rule depending on the system information, wherein the first transformation rule is assigned to the database-specific data structure and defines a transformation of data with a system-specific data structure to the database-specific data structure;
   storing, by the sending system, the first transformation rule so that the sending system applies the first transformation rule on a data structure of a same type without retrieving the first transformation rule from the decentralized distributed database;
   transforming, by the sending system, the system data by applying the first transformation rule to the system data, thus generating transformed system data at the sending system that is stored in the database-specific data structure; and
   sending, by the sending system, the transformed system data to the decentralized distributed database in the database-specific data structure.

2. A computer-implemented method for retrieving data from a decentralized distributed database by a system, wherein the system is a device or an application, comprising:
   providing, by a receiving system, information about a system-specific data structure and a system information of the receiving system, the receiving system being connected to the decentralized distributed database, wherein the system information comprises information about a system type and/or a system version,
   retrieving, by the receiving system, data from the decentralized distributed database, wherein the data are stored in database-specific data structure,
   receiving, by the receiving system, a second transformation rule depending on the system information and/or the system-specific data structure, wherein the second transformation rule is assigned to the database-specific data structure and defines a transformation of data with the database-specific data structure to the system-specific data structure,
   storing, by the receiving system, the second transformation rule so that the receiving system applies the second transformation rule on a data structure of a same type without retrieving the second transformation rule from the decentralized distributed database;
   transforming, by the receiving system, the data by applying the second transformation rule, thus generating transformed data at the receiving system that is stored in the system-specific data structure,
   and
   outputting, by the receiving system, the transformed data in the system-specific data structure.

3. The computer-implemented method according to claim 1, wherein the first and/or second transformation rule defines a transformation of data with a system-specific data structure to the database-specific data structure and/or a transformation of data with the database-specific data structure to the system-specific data structure.

4. The computer-implemented method according to claim 1, wherein the database-specific data structure comprises code-specific data structure and wherein processing of data in the decentralized distributed database by a program code is based on a transformation rule which is configured to transform data with database-specific data structure to the code-specific data structure.

5. The computer-implemented method according to claim 1, wherein the information about the database-specific data structure, the first transformation rule and/or the second transformation rule are stored in a data library which is configured to store a variety of database-specific data structures and/or assigned transformation rules.

6. The computer-implemented method according to claim 1, wherein the first and/or second transformation rule is received from the data library.

7. The computer-implemented method according to claim 1, wherein depending on the system information, the information about the database-specific data structure, the first transformation rule and/or the second transformation rule are selected from the variety of stored database-specific data structures and assigned transformation rules.

8. The computer-implemented method according to claim 1, wherein a new database-specific data structure and/or a new transformation rule are added to the data library or the database-specific data structure and/or the transformation rules are updated while keeping originally stored database-specific data structures and/or transformation rules.

9. The computer-implemented method according to claim 1, wherein the new database-specific data structure and/or the new transformation rule are added to the data library or the database-specific data structure and/or the transformation rule are updated based on a consensus method performed by nodes of the decentralized distributed database.

10. The computer-implemented method according to claim 1, wherein a transformation rule is generated by the system depending on the system-specific data structure and the retrieved information about the database-specific data structure.

11. The computer-implemented method according to claim 1, wherein a system-specific data structure is assigned to the system and/or a system is assigned to a system-specific data structure.

12. A sending system, wherein the sending system is a device or an application, comprising:
a storage module which is configured to provide system data, wherein the system data are stored in a system-specific data structure of the sending system, and to provide a system information of the sending system, the sending system being connected to the decentralized distributed database, wherein the system information comprises information about a system type and/or a system version,
a first interface which is configured to receive information about a database-specific data structure, which is defined for processing data in the decentralized distributed database and a first transformation rule depending on the system information, wherein the first transformation rule is assigned to the database-specific data structure and defines a transformation of data with a system-specific data structure into the database-specific data structure, wherein the first transformation rule is stored so that the sending system applies the first transformation rule on a data structure of a same type without retrieving the first transformation rule from the decentralized distributed database;
a transformation module which is configured to apply the first transformation rule to the system data to generate transformed system data at the sending system, wherein the transformed system data are stored in the database-specific data structure,
and
a second interface which is configured to send the transformed system data to the decentralized distributed database in the database-specific data structure.

13. A receiving system, wherein the receiving system is a device or an application, comprising:
a storage module which is configured to provide information about a system-specific data structure and a system information of the receiving system, the receiving system being connected to the decentralized distributed database, wherein the system information comprises information about a system type and/or a system version,
a first interface which is configured to retrieve data from the decentralized distributed database, wherein they are stored in database-specific data structure, and to receive a second transformation rule depending on the system information and/or the system-specific data structure, wherein the second transformation rule is assigned to the database-specific data structure and defines a transformation of data with the database-specific data structure into the system-specific data structure, wherein the second transformation rule is stored so that the receiving system applies the second transformation rule on a data structure of a same type without retrieving the second transformation rule from the decentralized distributed database,
a transformation module which is configured to apply the second transformation rule to the data to generate transformed data at the receiving system, wherein the transformed data are stored in the system-specific data structure,
and
a second interface which is configured to output the transformed data in the system-specific data structure.

14. A decentralized distributed database connected to a sending system according to claim 12 and/or to a receiving system, comprising:
a data library which is configured to store a variety of database-specific data structures and assigned transformation rules, wherein a transformation rule defines a transformation of data with a system-specific data structure into a database-specific data structure and/or a transformation of data with a database-specific data structure into a system-specific data structure,
and
a data management module which is configured to retrieve information about a database-specific data structure and/or an assigned transformation rule from the data library and to provide the information to the sending system and/or the receiving system.

15. A computer program product, comprising a computer readable hardware storage device having computer readable program code stored therein, said program code executable by a processor of a computer system to implement a method loadable into the internal memory of a digital computer, comprising software code portions for performing the method of claim 1 when the computer program product is run on a computer.

16. The method according to claim 1, wherein the transforming the system data to transformed system data in the database-specific data structure is performed only by the sending device.

17. The method according to claim 1, wherein the transforming the system data to transformed system data in the system-specific data structure is performed only by the receiving device.

* * * * *